UNITED STATES PATENT OFFICE.

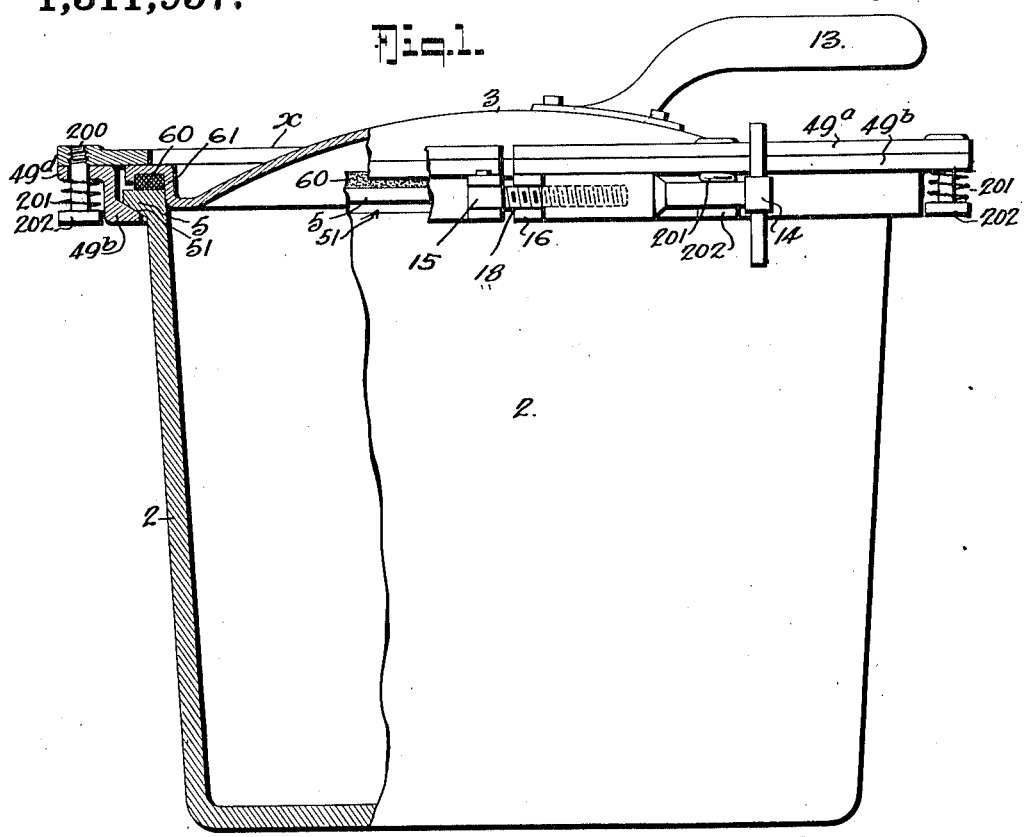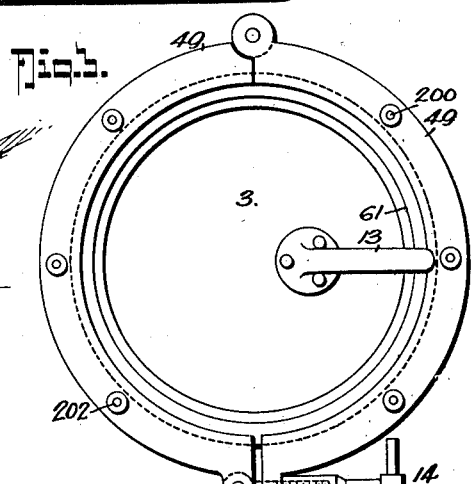

WALTON C. FERRIS, OF LINCOLN, NEBRASKA, ASSIGNOR TO THE NATIONAL MANUFACTURING COMPANY, OF LINCOLN, NEBRASKA.

STEAM-COOKER.

1,311,957.  Specification of Letters Patent.  Patented Aug. 5, 1919.

Original application filed September 18, 1917, Serial No. 192,000. Divided and this application filed April 11, 1918. Serial No. 227,882.

*To all whom it may concern:*

Be it known that I, WALTON C. FERRIS, a citizen of the United States, resident of Lincoln, in the county of Lancaster and State of Nebraska, have invented certain new and useful Improvements in Steam-Cookers, of which the following is a specification.

This invention has particular reference to that class of cooking utensils or kettles having a cover, and means for holding the cover to close down tight against the steam pressure within the kettle.

My present application is more particularly directed to the specific construction of an improved means for clamping the cover onto the kettle or pot rim, when arranged as disclosed in my copending application Serial No. 192,000 for steam cookers, filed September 18, 1917, of which this application is a division.

My present improved pot cover clamping means includes upper and lower opposing clamping members, one of which clamps over the rim edge of the cover and the other or lower one of which clamps against the under side of the kettle or pot rim, an improved construction of tension devices being also provided for yieldingly connecting the opposing clamping members, which, under normal conditions, tend to hold the said opposing clamping members in such tight engagement with the cover and the kettle rim as to thereby secure the cover against predetermined steam pressures which members separate to allow for escape of steam from the kettle when the pressure therein exceeds that for which the tension devices are set.

In its more subordinate nature, my present invention embodies certain details of construction and novel combination of parts, all of which will be hereinafter explained, specifically pointed out in the appended claims and illustrated in the accompanying drawing, in which:

Figure 1 is an elevation of my improved steam cooker, parts being in side view and other parts being in vertical section, the cover member being shown at the closed or steam-tight position.

Fig. 2 is a detail vertical section of the form of my invention shown in Fig. 1, the cover being shown as operating as an emergency valve to allow for the escape of excessive steam pressure within the pot or kettle.

Fig. 3 is a top plan view of the construction shown in Fig. 1.

In carrying out my present invention, the upper edge of the kettle or body 2 terminates in an annular clamping rim 5 which, as is clearly shown in Figs. 1 and 2, includes an external undercut upwardly and outwardly inclined bearing surface 51, the purpose of which will presently appear.

3 designates the sheet metal cover and in the construction shown, the said cover includes an inverted U-shaped annular rim 61, that fits over and embraces a pliable gasket 60 held on the top of the kettle rim 5 when the parts are assembled for use.

13 designates a lifter handle attached to the cover 3.

The means for holding the cover closed over the kettle top includes a ring-like body composed of two members 49—49 hinged together as at 20 to swing horizontally to the open or closed positions.

The members 49—49 each consist of separate upper and lower members $49^a$—$49^b$, see Figs. 1 and 2, by reference to which it will be noticed the upper member $49^a$ is in the nature of a flat semi-circular ring, the inner flange $x$ of which, when the two sections of the clamping device are closed fits over and onto the annular rim 61 of the cover 3, as shown.

The lower member $49^b$ includes an inwardly extended flange provided with a beveled bearing surface $49^c$ that engages with the undercut beveled bearing surface 51 of the annular kettle rim 5, and the said lower member $49^b$ includes a semi-circular rim or flange $49^d$ that is normally held in yieldable engagement with the underside of the upper ring member $49^a$, by a series of coiled springs 201 supported on the heads 202 of screw studs 200 that pass through apertures in the member $49^b$ and thread into the upper ring member $49^a$, as shown.

By connecting the upper and lower members $49^a$—$49^b$ of the clamping sections in the manner stated and shown, the said parts can operate as an emergency safety valve, it being understood that so long as the pressure within the kettle 2 is below the pressure of the springs 201, the cover effects a steam-tight closure of the kettle, but should the internal pressure within the kettle rise above the pressure of the said springs 201, the upper members 49ª of the clamping device will recede from the lower members 49ᵇ and the cover rim 61, the latter being now free to rise from the kettle rim 5 under the steam pressure within the pot and acting, as it were, as an emergency safety valve.

The two members 49—49 of the compression device are adjusted to a proper operative position around the kettle rim 5 and the cover rim 61 by a screw connection 18, best shown in Figs. 1 and 3, by reference to which it will be seen that when the two members 49—49 are adjusted to the proper operative position around the kettle rim 5, the said members can be drawn together against the said rim 5 and the rim 6 by tightening up a winged member 14 which has an internally threaded socket for screwing onto the free end of the screw bolt 18.

By referring to Fig. 3 of the drawings, it will be noticed the screw bolt 18 is pivotally connected to a lug 15 that projects radially from one of the members 49 and the said bolt is adapted for being swung within a forked lug 16 that extends from the adjacent end of the other member 49.

When the winged member 14 and the bolt 18 are positioned, as indicated on the said Fig. 3, the threaded socket of the member 14 engages the lug 16, and as the said member 14 is screwed onto the bolt 18, the beveled flanges 49ᶜ—49ᶜ of the lower members 49ᵇ of the ring-like body are caused to engage the beveled surface 51 of the kettle rim and at the same time and the upper flat member 49ª is caused to engage with the cover rim 61 which rests upon the gasket 60.

As the members 49—49 are drawn together by tightening the winged member 14, as stated, the beveled portions 49ᶜ—49ᶜ engage the beveled surface 51 of the kettle rim and effect the compression of the upper members 49ª—49ª (that extend over the cover rim 61) downwardly against the rim 61, compresses the gasket 60 and thereby makes a steam tight closure of the cover on the kettle.

To release the cover, it is only necessary to loosen the winged member 14 and to swing it out of engagement with the forked lug 16 to permit of opening the two part ring-like members 49—49 sufficiently to disengage the cover rim 60 and the kettle rim 5.

From the foregoing description taken in connection with the drawing, it is thought the complete construction of my present invention will be readily understood by those skilled in the art to which it appertains.

What I claim is:

1. In a pressure cooker which includes a pot having an annular rim, a cover having a rim for engaging the annular rim, and means for clamping the parts together, the said means comprising a two-part ring-shaped clamp adapted to extend around the outer edge of the annular pot rim and the cover rim, each part of the said clamping ring comprising an upper member for clamping down onto the cover rim, a lower member for clamping up against the aforesaid annular pot rim and tension devices for normally forcing the said upper and lower parts of the clamping ring together to hold the opposing bearing portions of the ring-shaped clamp in tight engagement with the cover rim and the annular rim of the pot and adapted when the steam pressure in the cooker exceeds the stress of the tension devices to yield and permit the excess steam pressure within the cooker to escape.

2. In a steam cooker, a pot having an annular rim with an outer undercut beveled bearing surface, a cover having a rim for resting on the pot rim, means for holding the said cover clamped down on the said pot rim, the said means consisting of a two-part ring-shaped clamp, each part being composed of opposing upper and lower members, the lower members having flanged bearing surfaces for engaging the external beveled bearing surface of the pot rim, the upper member being flat and adapted for resting on the cover rim, tension devices that connect the upper and lower clamping members and hold the pot and cover rims in clamped position, the said tension devices being adapted to yield when steam pressure in the pot is greater than the tension of the said devices to thereby permit the cover to rise from the pot rim.

WALTON C. FERRIS.